United States Patent [19]
Skibinski et al.

[11] Patent Number: 5,483,142
[45] Date of Patent: Jan. 9, 1996

[54] PRECHARGE CIRCUIT HAVING MICROPROCESSOR-BASED FIRING ANGLE CONTROL CIRCUITRY

[75] Inventors: Gary Skibinski, Milwaukee; Thomas Gilmore, Wauwatosa, both of Wis.

[73] Assignee: Allen-Bradley Company, Inc., Milwaukee, Wis.

[21] Appl. No.: 124,893

[22] Filed: Sep. 22, 1993

[51] Int. Cl.⁶ .................. H02J 1/00; H02J 4/00; H02M 5/42
[52] U.S. Cl. .................................... 320/1; 363/87
[58] Field of Search .................... 320/1; 363/87, 363/137

[56] References Cited

U.S. PATENT DOCUMENTS 4,586,118  4/1986  Mihalka .................. 363/17
4,816,985  3/1989  Tanahashi ................ 363/81
4,965,860  10/1990  Jochi ..................... 219/113
5,142,435  8/1992  Baumgartner et al. ........ 361/160

Primary Examiner—Peter S. Wong
Assistant Examiner—Robert Nappi
Attorney, Agent, or Firm—Andrew J. Nilles; John J. Horn; George A. Montanye

[57] ABSTRACT

A capacitor precharge circuit limits both peak DC link current and peak AC line current to any desired peak magnitude thereby providing for optimum precharge control and robust operation. The precharge circuit employs a microprocessor which implements a non-linear discontinuous current control scheme without the need for current sensors. The precharge circuit is well suited for use with an AC to DC converter having link inductor and a DC bus capacitor which requires precharging before full power is applied to the converter.

16 Claims, 13 Drawing Sheets

5,483,142

PRECHARGE CIRCUIT HAVING MICROPROCESSOR-BASED FIRING ANGLE CONTROL CIRCUITRY

BACKGROUND OF THE INVENTION

1. Field of the Invention

The invention relates to precharge circuits and, more particularly, relates to precharge-circuits using microprocessor-based firing angle control circuitry.

2. Discussion of Prior Art

Precharge circuits are well known for precharging a DC bus capacitor in AC to DC converters. The bus capacitor is used to decrease the ripple voltage of an AC to DC rectifier output. The bus capacitor must be precharged before full power is applied to the converter, otherwise severe transients will occur.

In FIG. 1, a simple AC to DC converter without a precharge circuit is shown. In FIG. 2, a simple AC to DC converter with a precharge circuit is shown. In FIGS. 3 and 4, commonly used AC to DC converters with precharge circuits incorporating additional features are shown. In FIG. 5, an AC to DC converter comprised of Silicon Controlled Thyristors (SCRs) and utilizing a conventional linear phase control scheme is shown.

Referring to FIG. 1, a simple AC to DC converter 10 without a precharge circuit is shown. Converter 10 has a three phase AC supply 11 which is engaged when the utility customer closes a connect/disconnect switch 12. The AC supply flows through drive fuses 14 and is rectified by a three phase diode bridge rectifier 16. Link current flows from rectifier 16 through link inductor 18 and charges DC bus capacitor 19. A DC bus output 17 of the converter 10 is typically connected to an inverter (not shown), which converts the DC output power back to AC power.

A first problem with this converter design is that the application of full line voltage to the converter during power start-up results in a large peak surge current to charge the bus capacitor, initially at zero voltage. More specifically, the surge current can be approximated as the peak line voltage divided by the surge impedance $Z_o$, where $Z_o$ is equal to the square root of the link inductance divided by the bus capacitance. The surge current is usually above the semiconductor diode maximum allowable rating, causing the diode to be unduly stressed and to have a decreased number of life turn-on cycles before failure. The large peak AC current will also cause unacceptable fuse fatigue and possibly cause the fuses to blow. The large precharge DC current through link inductor 18 will typically saturate the link inductor 18, which is 150% the size needed for steady state operation. The saturated link inductor impedance is reduced to an air core winding inductance value, further increasing precharge current stress. Link inductor saturation can be prevented and current stress reduced with a link inductor magnitude approximately ten times the size needed for steady state operation. However, an oversized inductor will increase the size and cost of the converter.

A second problem with this design is that the application of full line voltage to the converter during power start-up results in large voltage overshoots (approaching twice peak line voltage) in the capacitor 19. This problem is caused by the resonant nature of the inductor-capacitor combination, and is particularly severe given that the inductor-capacitor circuit is nearly undamped.

A third problem is that, in the event of a faulted DC bus, precharge operation will result in an unacceptably large current flowing into the fault. There is nothing in the line to limit the current caused by a ground fault (node 15 shorted to ground or node 13 shorted to ground) or a bus fault (node 15 shorted to node 13). The resulting link fault current will typically saturate the link inductor 18 to low inductance values. Thus, link fault current will see little impedance as it flows through the saturated link inductor directly into a ground fault or bus fault.

Referring to FIG. 2, an AC to DC converter 20 is shown which comprises a precharge circuit 23. A three phase AC supply 21 is engaged when the utility customer closes customer connect/disconnect switch 22. Current from phase A flows through a drive fuse 30a and into a three phase diode bridge rectifier 24. Link current from the rectifier 24 then flows through a DC link inductor 26 and charges a bus capacitor 28. The circuit is completed by precharge damping resistor 32 which is connected to phase C through precharge fuse 36b.

Control circuitry supply transformer 34 is connected to phases B and C through precharge fuses 36a and 36b. Transformer 34 supplies AC power to an AC to DC converter 38. Converter 38 supplies DC power to power supply 40, which outputs standard +5 v, +15 v, and −15 v voltage sources. These voltage sources are supplied to control circuitry 42. Control circuitry 42 uses differential amplifier 37 to sense when bus capacitor 28 is fully charged, and then responds by closing power contactor 44. In addition to phase A current, current from phases B and C will now flow through the rectifier 24 as well, and DC bus output 29 will be on-line.

The addition of a precharge circuit improves the performance of converter 20 as compared to converter 10. The resonant inductor-capacitor circuit is now damped by precharge resistor 32, which lessens the severity of the voltage and current transient characteristics.

With regard to current transients in particular, the addition of the precharge resistor will improve transient performance by limiting current. However, if the value of the precharge resistor is low, the majority of the peak surge current is now taken as a single pulse of current in phase A and C devices rather than being spread out over a number of 60° intervals. Increasing the precharge resistor values will decrease the peak surge current and spread device heating over a number of 60° charging intervals, as well as reducing the fuse 36b current rating and cost. However, a larger precharge resistor will also result in a longer time required for capacitor precharge.

Additionally, the problem incurred when operating into a faulted DC bus still exists. Finally, this circuit has a new disadvantage: additional parts are needed including power contactor 44 which is expensive and adds significant cost to the converter.

Referring to FIG. 3, a converter circuit 50 is shown which comprises a precharge circuit 55. A three phase AC supply 51 is engaged when a connect/disconnect switch 53 is closed. However, application of power through the disconnect switch 53 does not immediately charge bus capacitor 60. Instead, the customer must first depress push button 73 which is located in a converter cabinet down-line from the disconnect switch. Also, control circuitry 78 will verify that there are no faults and that phase loss relay 68 has the correct voltage. When push button 73 is depressed and there are no line faults, control circuitry 78 will cause precharge relays 62 and 66 to close.

Current from phase A will then flow through drive fuse 52a, precharge fuse 70, precharge relay 66, precharge damping resistor 64, and into a three phase diode bridge rectifier 56. Rectifier 56 converts the AC power to DC power. Link current then flows from rectifier 56 through the DC link inductor 58 and into DC bus capacitor 60. The circuit is then completed by relay 62, precharge fuse 71b, and drive fuse 52c.

A control circuitry supply transformer 72, AC to DC converter 74, and power supply 76 work to supply control circuitry 78 with power in a manner similar to the corresponding elements in converter 20.

The voltage $E_f$ across the bus capacitor 60 is measured by differential amplifier 77. When the control circuitry 78 senses that the DC bus capacitor 60 is fully charged, it will engage power contactor 54. Alternatively, a timer (not shown) which will automatically cause the contactor to close may be used. This is commonly done to avoid having to use sensing circuitry. Once the contactor 54 is closed, the DC bus will be on-line.

Converter 50 has the same transient, faulted DC bus, and power contactor problems encountered with converter 20. Converter 50 is an improvement over converter 20 in that it detects line faults before attempting to charge the DC bus capacitor.

Referring now to FIG. 4, a converter 80 is shown which comprises a precharge circuit 85. This converter design is typically used in Japan. A three phase AC supply 83 is engaged when the customer closes a connect/disconnect switch 81.

Current will flow through drive fuses 82 into a three phase diode bridge rectifier 84. During precharge operation, power contactor 88 is open. DC current flows from rectifier 84 through a precharge resistor 86, a precharge fuse 92, and a DC link inductor 90 to charge DC bus capacitor 94. Control circuitry 104 will sense when capacitor 94 is charged using differential amplifier 103 and respond by closing power contactor 88.

A control circuitry supply transformer 96 is connected to phases B and C through the fuses 98a and 98b. The control circuitry supply transformer 96, AC to DC converter 100, and power supply 102 operate to supply control circuitry 104 with power in a manner similar to the corresponding elements in precharge circuit 20.

Converter 80 has transient, faulted DC bus, and power contactor problems similar to those encountered with converters 20 and 50. Converter 80 has the additional disadvantage that it requires a large contactor rated to break DC inductive current. This requirement will further increase the cost as compared to the AC supply contactor system and is also difficult to procure at high power levels.

Referring to FIG. 5, an AC to DC converter 110 is shown which comprises a precharge circuit 115. The precharge circuit is further comprised of linear phase control electronics 134 and a three phase SCR rectifier 123 which implement a linear phase control scheme.

A three phase AC supply 112 is engaged when the utility customer closes a customer disconnect switch 114. Current from the AC supply flows through drive fuses 116a, 116b, 116c and into the three phase SCR rectifier 123. Link current from the rectifier 123 flows into a link inductor 128 and charges a DC bus capacitor 130. The SCR rectifier 123 selectively controls when current from each phase of the three phase AC supply 112 will be used to charge the bus capacitor 130. A snubber circuit comprised of a resistor 124 in series with a capacitor 126 prevents nuisance firing of the SCRs in rectifier 123.

The firing times of the SCRs in rectifier 123 are controlled by the electronics 134. The electronics 134 receive line-to-line voltage measurement inputs and a bus capacitor voltage measurement input. Line-to-line voltages are measured by differential amplifiers 132a and 132b, passed through filters 118a and 118b, and input to the electronics 134 at inputs 120a and 120b. Filters 118a and 118b are used to remove the effects of SCR commutation line notches. The voltage $E_f$ across the bus capacitor 130 is measured by differential amplifier 138, passed through filter 136, and finally input to the electronics 134. The electronics 134 outputs control signals to the SCR rectifier 123 at outputs 133a through 133f.

A control circuitry supply transformer 120 is connected to phases B and C through the fuses 119a and 119b. The control circuitry supply transformer 120, AC to DC converter 122, and power supply 124 operate to supply electronics 134 with power in a manner similar to the corresponding elements in precharge circuit 20.

A standard equation which might form the basis of a linear phase control scheme is given in equation 1.

$$V_d = V_{dio}\cos\alpha = \frac{3\sqrt{2}}{\pi} V_{l\text{-}l(rms)}\cos\alpha \qquad (1)$$

where $V_{l\text{-}l(rms)}$ is the line to line voltage of the input $V_d$ is the DC link voltage at the SCR rectifier output $V_{dio}$ is the DC link voltage at the SCR rectifier output when $\alpha=0$ radians $\alpha$ is the SCR control firing angle in radians The firing angle is defined as the phase angle at which the SCR is turned on by the precharge circuit. The firing angle is equivalent to a firing time, except that it is specified in terms of the phase angle of a line-to-line voltage (and shifted by 60 degrees), rather than in terms of time. Typically, $\alpha$ is defined such that $\alpha=0$ when the line-to-line phase angle $\theta=60$.

A conventional linear cosine rider scheme can be used to control link current. For information on linear cosine rider schemes, see Richard Pearlman, "Power Electronics and Solid State Motor Control," Prentice Hall (1980) and Albert Kloss, "A Basic Guide to Power Electronics," John Wiley and Sons (1984), both of which are incorporated herein by reference. If a linear cosine rider scheme is used, then equation 1 can be implemented as given in equation 2.

$$V(\alpha) = \frac{E_f}{\frac{3\sqrt{2}}{\pi} V_{l\text{-}l(rms)}} \qquad (2)$$

where $E_f$ is the feedback voltage measured across the DC bus capacitor, $V(\alpha)$ is an SCR control voltage which corresponds to the radian firing angle and is generated by the cosine rider scheme.

The SCR firing angle versus time is adjusted with $V(\alpha)$ by feeding back the bus capacitor voltage $E_f$ and measuring the line-to-line voltage $V_{l\text{-}l}$. The resulting voltage difference between $V_d$ and $E_f$ across the link inductor limits the peak DC link current.

A major drawback to converter 110 is that the system will function properly only when the performance of its elements is linear. Thus, if the performance of one of its elements becomes non-linear, then equations 1 and 2 will no longer apply and the system will cease to function properly. Performance can become non-linear in at least three situations.

First, the link inductor 128 may saturate and its performance become non-linear. System components are commonly chosen based on optimal steady state operation. However, the minimum allowable controlled link current during precharge with this conventional control scheme is much greater than the steady-state link current, causing the link inductor to saturate. The inductor may be oversized, but this will add to the cost and size of the system, and the inductor will no longer be optimal for steady state operation. The higher precharge current also requires the input fuses 116a–116c to be increased, thereby providing a non-optimal fuse coordination for SCR short circuit protection.

A second instance where system performance is nonlinear is at the limit of link current discontinuity. Charge is preferably supplied to the capacitors over several 60 degree cycles to avoid stress problems caused by large peak currents. At the endpoint of each 60 degree cycle, however, the current is discontinuous. A linear phase control system will not be able to maintain linear operation through these discontinuities, resulting in non-controlled discontinuous current pulses of high peak magnitude.

A third instance where system performance is non-linear is when the peak magnitudes of the line-to-line voltages are varying as the capacitor is charging (e.g., as in the case of line transients on the AC supply). Once the alpha firing angle in a linear system is set, there is no more control and the system can not handle varying voltages. A linear system can not handle non-linear variations in the line-to-line voltages.

In addition to its inability to operate in a non-linear environment, the linear precharge control converter suffers from the same high peak current, non-controlled ground/bus fault current, and bus voltage overshoot problems as the converters described above.

SUMMARY OF THE INVENTION

A capacitor precharge circuit is presented. More specifically, a capacitor precharge circuit which utilizes microprocessor-based firing angle control circuitry is presented.

The device of the present invention comprises a microprocessor which controls an SCR rectifier bridge. The microprocessor implements a control scheme which limits both peak DC link current and peak AC line current to a desired magnitude during a drive precharge mode without the need for any current sensors. This is accomplished by establishing an alpha control law for determining the firing angles of the SCRs. The control law dictates when each SCR of the SCR rectifier bridge is turned on, while SCR turn off is accomplished by conventional line commutation. The instantaneous difference between the controlled SCR bridge output voltage and bus capacitor voltage define the voltage across the DC link inductor and therefore the peak DC link current into it, as well as the peak current into the bus capacitor.

More particularly, a circuit of the present invention comprises a capacitor, a source of charge such as an AC supply, and a capacitor precharge subcircuit for precharging the capacitor. The precharge subcircuit includes a switching device for transferring charge from the source of charge to the capacitor, and microprocessor means for controlling the switching device. A circuit of the present invention might further comprise voltage measuring means for taking voltage measurements of the AC supply and providing the AC supply voltage measurements to the microprocessor means, and voltage measuring means for taking voltage measurements of the AC supply and providing the capacitor voltage measurements to the microprocessor means.

A method by which the circuit precharges a capacitor from an AC supply comprises the steps of taking voltage measurements of the AC supply, taking voltage measurements across the capacitor, providing the AC supply voltage measurements and the capacitor voltage measurements to a microprocessor, and using the microprocessor to selectively transfer charge from the AC supply to the capacitor based on the AC supply voltage measurements and the capacitor voltage measurements.

One advantage of the precharge circuit is that it is robust and can operate in a variety of circumstances. The precharge circuit can operate into a partially precharged bus capacitor. The precharge circuit can also operate with input line transients and ground or bus faults. The control law described is valid for all conditions of the bus capacitor. Finally, in the event of an undervoltage, the precharge circuit can implement a DC bus recovery scheme and maintain operation during the undervoltage.

A second advantage of the precharge circuit is that it results in optimum precharge control. The precharge circuit is able to charge the bus capacitors in the fastest possible time under a user defined current limit restraint. The precharge current can be limited to any value less than or equal to the steady state rated current under full-load conditions. In addition, the peak DC link current is maintained constant through the link inductor by a single adjustable control parameter. The precharge circuit is also optimal in the sense that the DC bus capacitor voltage overshoot problem at the end of capacitor precharge is totally eliminated.

Finally, the precharge circuit has the advantage of decreased package size and cost. In particular, the precharge circuit has the advantage of not requiring a power contactor which is large in both size and cost. Additionally, since the alpha control law described herein is implemented using only voltage measurements, there is no need for any current sensors.

Other objects, features, and advantages of the present invention will become apparent to those skilled in the art from the following detailed description and accompanying drawings. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

DETAILED DESCRIPTION OF THE PREFERRED EMBODIMENT

1. Structure of the Invention

Figure 6:
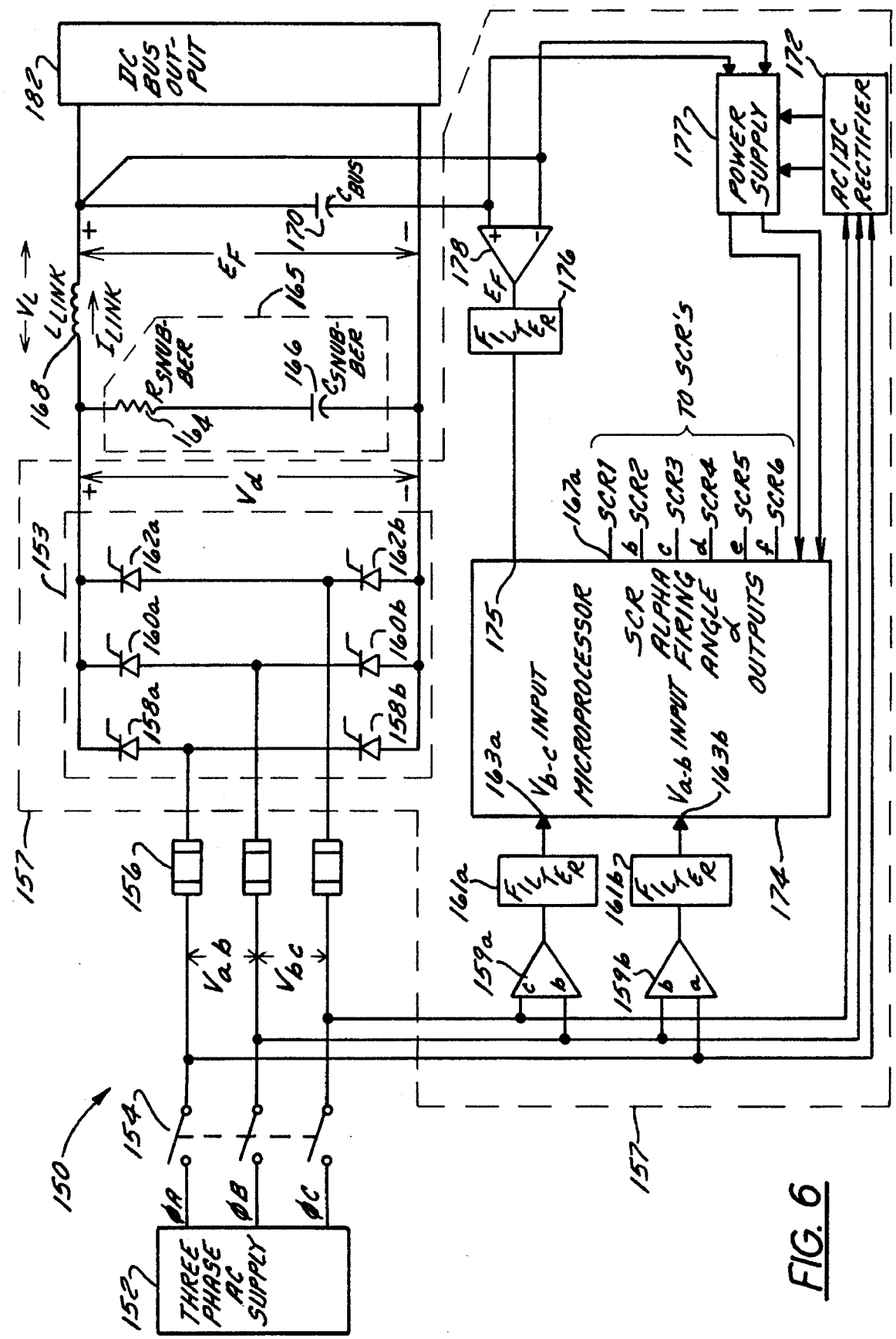
FIG. 6 is a schematic of an AC to DC converter comprising a precharge circuit constructed in accordance with the preferred embodiments of the present invention.

Referring now to FIG. 6, an AC to DC converter 150 is shown which comprises a precharge circuit 157. The precharge circuit 157 is further comprised of a microprocessor 174 which implements a non-linear current control scheme.

A three phase AC supply 152 is engaged when the disconnect switch 154 is closed. AC supply 152 could be electrical power from a utility company, or it could be an independent generator. Current from the AC supply 152 flows through drive fuses 156 and into a three phase SCR rectifier 153. The SCR rectifier 153 is comprised of six SCRs 158a and 158b, 160a and 160b, and 162a and 162b (two per phase) which are controlled by microprocessor 174.

Link current from rectifier 153 flows into a link inductor 168 and charges a DC bus capacitor 170. DC bus capacitor 170 is in parallel with a DC bus output 182. DC bus output 182 is also connected to precharge control power supply 177 which supplies power to microprocessor 174. The microprocessor is also supplied with power by an AC to DC converter 172 which is connected to the three phase AC supply 152. The AC to DC converter 172 supplies microprocessor with power during precharge, whereafter the DC bus output 182 is used.

The firing angles of the SCRs in rectifier 153 are controlled by microprocessor 174. Microprocessor 174 receives a bus capacitor voltage measurement input $E_f$ and line-to-line voltage measurement inputs $V_{a-b}$ and $V_{b-c}$. The voltage $E_f$ across the bus capacitor 170 is measured by differential amplifier 178, passed through filter 176, and finally input to the microprocessor 174 at input 175. Line-to-line voltages are measured by differential amplifiers 159a and 159b, passed through filters 161a and 161b, respectively, and input to microprocessor 174 at inputs 163a and 163b, respectively. Filters 161a and 161b are used to remove the effects of SCR commutation line notches. The microprocessor 174 outputs control signals to the SCR rectifier 153 at outputs 167a through 167f.

A snubber circuit 165 is in parallel with rectifier 153 and is comprised of a resistor 164 in series with a capacitor 166. Snubber circuit 165 prevents nuisance firing of the SCRs 158a and 158b, 160a and 160b, and 162a and 162b in rectifier 153.

Although there are three line-to-line voltages, only two measurements need be made because the third voltage can be calculated from the first two. Also, the more general $V_{l-l}$ denotation will now be used to reference the line-to-line voltage ($V_{a-b}$, $V_{a-c}$, or $V_{b-c}$) which is being used to supply the bus capacitor 170 with charge.

Note also that instead of SCRs in rectifier 153, Gate Turn Off Thyristors (GTOs) or Insulated Gate Bipolar Transistors (IGBTs) may also be used. Methods of replacing SCRs with GTOs or IGBTs are known to those of ordinary skill in the art.

2. General Description of Precharge Algorithm

An algorithm which may be implemented by the microprocessor 174 for the non-linear control of the SCR firing angles is now described.

In general, precharging the capacitor 170 comprises the steps of providing an AC supply 152, taking voltage measurements of the AC supply 152, taking voltage measurements across the capacitor 170, providing the AC supply voltage measurements and the capacitor voltage measurements to a microprocessor 174, and using the microprocessor 174 to selectively transfer charge from the AC supply 152 to the capacitor 170 based on the AC supply voltage measurements and the capacitor voltage measurements. The capacitor 170 therefore has intervals during which it is precharged and which correspond to voltage cycles of the AC supply 152. The selective transfer of charge occurs during this precharge interval.

The precharge interval can be subdivided into an active precharge interval and a passive precharge interval. During the active precharge interval, the magnitude of the AC supply 152 (or of one of its phases) is greater than the voltage magnitude of the capacitor 170. The precharge is "active" in the sense that the SCRs of a phase are selectively turned on at an appropriate firing angle each cycle so that the resulting peak DC link current through the inductor 168 is controlled; with charge being transferred from the AC supply 152, through the rectifier 153, to inductor 168 and to capacitor 170.

During the "passive" precharge interval, the current build-up which occurred in the inductor 168 during the active precharge interval is now decreasing and causing additional charge to be transferred from the inductor 168 to the capacitor 170. Since this additional charge initially was supplied to the inductor 168 by the AC supply 152 (during the active precharge interval), the passive precharge interval is simply a second step in the transfer of charge from the AC supply 152 to the capacitor 170. During the passive precharge interval, the SCRs are no longer actively kept turned on by the microprocessor 174, but they passively remain forward conducting due to the current build up in the inductor 168. The SCRs remain forward conducting and connected to the AC supply 152 until the link current reaches zero. At this time, the SCRs are line commutated to the off state.

In order to optimally precharge the capacitor 170, the microprocessor 174 selectively transfers charge from the AC supply to the capacitor 170 such that peak DC link current is limited to a desired optimal magnitude. A "desired magnitude" is "optimal" in the sense that the capacitor 170 is charged in the fastest possible time within the rectifier 153 peak current rating, but not so quickly that rectifier 153, drive fuses 156, and inductor 168 are unduly stressed. Factors influencing the selection of an optimal desired magnitude, including the possible range, are given so that one skilled in the art may choose based on a particular application.

The step of selectively transferring charge from the AC supply 152 to the capacitor 170 is accomplished by first defining a desired peak current value. Second, this value is used to determine a reference parameter which represents an amount of charge that is to be transferred to the capacitor 170 during the active precharge interval. Third, a first point in time $t_1$ is determined which dictates when the active transfer of charge from the AC supply 152 is to be initiated. A time $t_1$ is determined for each precharge interval and is determined based on the reference parameter representing an amount of charge, the line-to-line voltage measurements, and the capacitor voltage measurements. Fourth, a second point in time $t_2$ is determined which dictates when the transfer of charge from the AC supply 152 is to be terminated. A time $t_2$ is determined for each precharge interval and is determined based on the line-to-line voltage measurements and the capacitor voltage measurements. Finally, the active precharge interval is initiated at time $t_1$ and terminated at time $t_2$.

In practice, $t_2$ is easier to determine than $t_1$, and therefore the preferred embodiment actually uses $t_2$ to approximate $t_1$. Additionally, in the preferred embodiment, the times $t_1$ and $t_2$ are specified in terms of the phase angle of the AC phase which is precharging the capacitor 170. Hence, the alpha control law of the present invention is described as determining the firing angles of the SCRs rather than firing times. Nonetheless, firing angles and firing times are functionally equivalent.

3. Mathematical Explanation of Algorithm and Operation

The derivational starting point is the well known equation which describes an inductor.

$$V_L(t) = L_{Link} \times \frac{di}{dt} \tag{3}$$

where $V_L$ is the voltage across the link inductor 168, $L_{link}$ is the value of the link inductor 168, dt is differential time, and di is the differential current through the link inductor 168. Multiplying both sides by dt and applying an integral yields equation 4.

$$\int_{t_1}^{t_2} V_L(t)dt = \int_0^{I_{(Peak)}} L_{Link}di \tag{4}$$

where $I_{(peak)}$ is the peak current through the inductor 168, $t_1$ is the time at which the SCR is turned on, and $t_2$ is the time at which peak current through the SCR occurs.

The left integral of equation 4 represents the volt-seconds (VS) applied across the inductor.

As will be demonstrated later, current will start to flow when the SCR is initially turned on at time $t_1$; and the current will be at a maximum through the SCR at time $t_2$.

Since the value of the link inductor 168 does not vary with time and does not vary with current assuming non-saturation conditions, the only parameter which varies on the right half of equation 4 is the peak current $I_{(peak)}$. It is therefore apparent from equation 4 that a constant peak current can be maintained at every 60° interval by controlling the inductor discontinuous volt-second product. This is done by adjusting the times when the SCRs are turned on. We therefore define a positive volt-second reference parameter $VS_R$ based on a desired peak current $I_{DC(Desiredpeak)}$.

$$VS_R = L_{Link} \int_0^{I_{DC(DesiredPeak)}} di = L_{Link} \times I_{DC(DesiredPeak)} \tag{5a}$$

where $I_{DC(DesiredPeak)}$ is the desired peak current through the DC link.

The reference parameter $VS_R$ can also be defined in terms of the voltage across the link inductor $V_L(t)$.

$$VS_R = \int_{t_1}^{t_2} V_L(t)dt \tag{5b}$$

Referring first to equation 5a, the discontinuous DC current pulse through the link inductor 168 will equal the AC line current pulse of the phase which is supplying power during controlled operation. Therefore, a desired peak DC link charging current is limited by the peak rated AC line current.

$$I_{DC(DesiredPeak)} \ngtr I_{AC(RatedPeak)} \tag{6}$$

where $I_{AC(RatedPeak)}$ is the rated line current under full load steady state condition.

Substituting equation 6 into equation 5a yields equation 7.

$$VS_R = L_{DCLink} \times I_{DC(DesiredPeak)} \leqq L_{DCLink} \times I_{AC(RatedPeak)} \tag{7}$$

Thus, equation 7 defines the maximum $VS_R$ that may be chosen. A reduced $VS_R$ may be desirable, for example, to provide additional lower current limit protection during the precharge mode. A reduced $VS_R$ may also be desirable if old capacitors are used, and a slower charge rate is needed to re-form the capacitor oxide insulating layer.

Returning now to equation 5b, this equation will be used to build a control scheme for ensuring that the correct amount of positive volt-seconds is applied across the link inductor 168 thereby controlling the precharge current through capacitor 170. Before equation 5b can be evaluated, the voltage $V_L(t)$ across the link inductor 168 must first be evaluated.

The voltage $V_L(t)$ across the link inductor 168 may be calculated by subtracting the DC voltage across the DC bus capacitor $E_f$ from the output DC voltage of the rectifier $V_d(t)$. In the control region of interest ($t_1$ to $t_2$), $V_d(t)$ may be approximated as $V_{1-1}(t)$. Therefore, the voltage across the link inductor can be calculated using the line-to-line voltage $V_{1-1}(t)$ and the voltage $E_f$ across the bus capacitor, as shown by equation 8.

$$V_L(t) = V_{1-1}(t) - E_f \tag{8}$$

With regards to the voltage $E_f$ across the capacitor 170, it is assumed that there is only a small incremental increase in capacitor voltage during each charging interval to simplify analysis. This assumption allows $E_f$ to be approximated as a constant.

Substituting equation 8 into equation 5b yields equation 9. Rewriting equation 9 in terms of radians yields equation 10.

$$VS_R = \int_{t_1}^{t_2} [V_{l-l}(t) - E_f]dt \tag{9}$$

$$VS_R = \frac{1}{2\pi f} \int_{\theta_{min}}^{\theta_{max}} [V_{l-l}(\theta) - E_f] d\theta \quad (10)$$

where
- $\theta_{min}$ is the phase angle of the line-to-line voltage at the time $t_1$ that the SCR is to turn on,
- $\theta_{max}$ is the phase angle of the line-to-line voltage at the time $t_2$ corresponding to the peak desired current, and
- $f$ is the frequency of the line-to-line voltage.

Figure 7A:
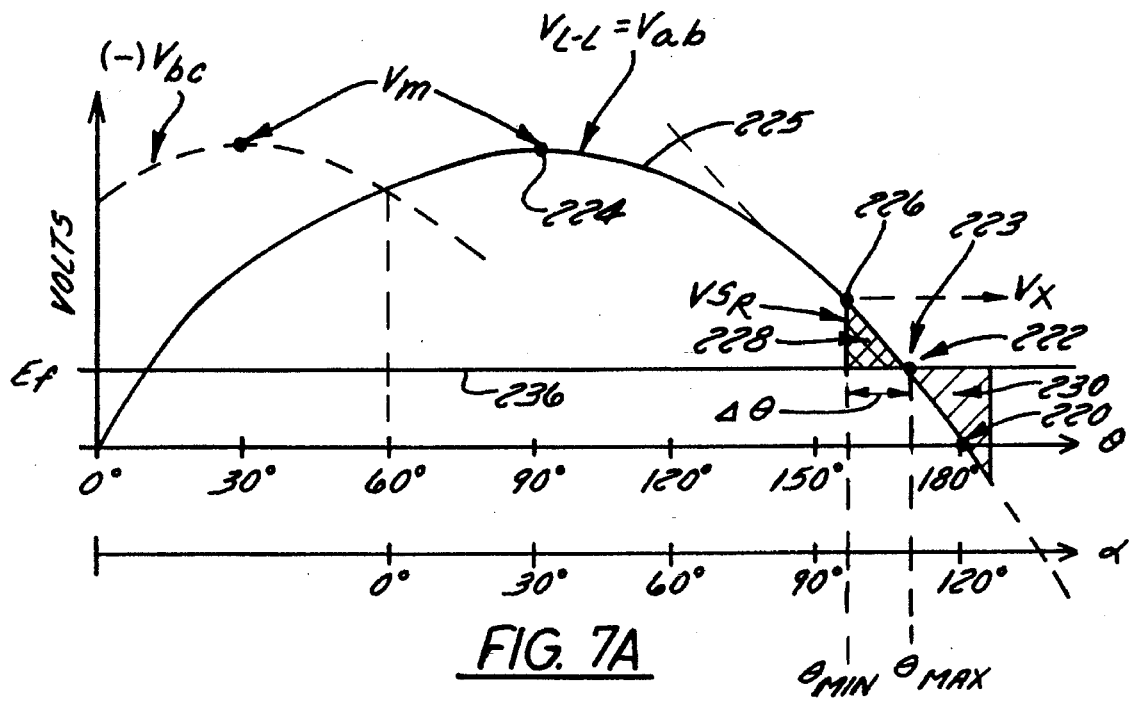
FIG. 7A and 7B illustrates the relationship between the SCR alpha firing angle and the controlled charging current into the bus capacitor in the control scheme of the preferred embodiment.

The integral in equation 10 is shown graphically in FIG. 7A as shaded region 228. The area of shaded region 228 is equal to the $VS_R$ volt-second reference parameter. Corresponding to shaded region 228 is shaded region 232 in FIG. 7B which illustrates the resulting current through the inductor 168 as a function of time rather than voltage as a function of time. The area of shaded region 232 is equal to the amount of charge which flows into bus capacitor 170 during the active precharge interval.

Although FIG. 7 will be discussed in greater detail below, it is useful to note that FIG. 7B demonstrates that the current is at a maximum at time $t_2$. Thus, because the voltage across the inductor 168 is positive between times $t_1$ and $t_2$ (corresponding to phase angles $\theta_{min}$ and $\theta_{max}$), the current through the inductor 168 will increase during this time. Moreover, since the voltage across the inductor 168 is decreasing, the rate of current increase is also decreasing. Therefore, at time $t_2$ when the voltage across the inductor 168 decreases to zero, the current will be at a maximum.

It is clear from equation 10 that deriving an alpha control law requires being able to derive values for $\theta_{min}$ and $\theta_{max}$. The operating point of the system is now defined as $\theta_{max}$. The method of determining $\theta_{min}$ and $\theta_{max}$ will now be examined. The focus will first be on how to determine $\theta_{max}$, and then on how to determine $\theta_{min}$.

As already described, $\theta_{max}$ is the phase angle at which the line-to-line voltage $V_{1-1}$ intersects with the voltage $E_f$ across the bus capacitor 170. The angle $\theta_{max}$ can therefore be calculated by evaluating the line-to-line voltage at $\theta_{max}$ and by using the peak line-to-line voltage $V_m$.

$$E_f = V_{1-1|\theta_{max}} \leq V_m \sin\theta_{max} \quad (11)$$

where $V_m$ is the peak value of the line-to-line voltage.

$$\theta_{max} = \pi - \sin^{-1}\left[\frac{E_f}{V_m}\right] \quad (12)$$

To determine $\theta_{min}$, equation 10 is used and is repeated below for clarity.

$$VS_R = \frac{1}{2\pi f} \int_{\theta_{min}}^{\theta_{max}} [V_{l-l}(\theta) - E_f] d\theta \quad (10)$$

All parameters in equation 10 are known except for $\theta_{min}$. However, if equation 10 is solved for $\theta_{min}$, a transcendental equation will result. This means that the microprocessor 174 would have to iterate $\theta_{min}$ until the right and left sides are equal. This would be too time consuming for the microprocessor 174 given current microprocessor technology. Therefore, another simpler method is needed to solve for $\theta_{min}$.

The method of the preferred embodiment is to approximate the sinusoidal voltage as a decreasing ramp function during the active precharge interval ($t_1$ to $t_2$) and determine the area of the resulting triangle. This linear perturbation theory may be used since the $\theta_{min}$ angle is reasonably close to the known operating point $\theta_{max}$. Thus, the starting point is the general equation for the area of a triangle.

$$\text{Area} = \frac{1}{2} \times \text{Base} \times \text{Height} \quad (13)$$

The area which is calculated in equation 13 is equivalent to the integral of equation 10. Thus, defining the base of the triangle as the difference in phase angles and defining the height of the triangle as the difference in voltages yields equation 14.

$$VS_R = \frac{1}{2\pi f}\left[\frac{1}{2}(\theta_{max} - \theta_{min})(V_{l-l|\theta_{min}} - E_f|_{\theta_{max}})\right] \quad (14)$$

To solve equation 14 for $\theta_{min}$, a $\Delta\theta$ is first defined as follows:

$$\Delta\theta = \theta_{max} - \theta_{min} \quad (15)$$

As an intermediate step, $\Delta\theta$ is determined first and then used in equation 15 to determine $\theta_{min}$.

The voltage $V_{l-l}$ evaluated at $\theta_{min}$ as required in equation 14 can be determined as follows:

$$V_{l-l|\theta_{min}} = E_f + \left[\frac{dV_{l-l}}{d\theta}\bigg|_{\theta_{max}}\right]\Delta\theta \quad (16)$$

where $dV_{l-l}/d\theta$ is the derivative of the line-to-line voltage with respect to its phase angle evaluated at $\theta_{max}$.

Substituting equation 15 and equation 16 back into equation 14 yields equation 17.

$$VS_R = \frac{1}{4\pi f}[\Delta\theta]\left[E_f|_{\theta_{max}} + \left(\frac{dV}{d\theta}\bigg|_{\theta_{mkax}}\right)\Delta\theta - E_f|_{\theta_{max}}\right] \quad (17)$$

By canceling the $E_f$ terms and rearranging, equation 17 simplifies to equation 18.

$$VS_R = \frac{1}{4\pi f}[\Delta\theta]^2\left[\frac{dV_{l-l}}{d\theta}\bigg|_{\theta_{max}}\right] \quad (18)$$

Solving equation 18 for $\Delta\theta$ yields equation 19. Since the line-to-line voltage is sinusoidal, its derivative as required by equation 19 can be calculated by applying a $$\Delta\theta = \sqrt{4\pi f(VS_R)\frac{d\theta}{dV_{l-l}}} \quad (19)$$

cosine function.

$$\frac{d\theta}{dV_{l-l}}\bigg|_{\theta_{max}} = ABS\left[\frac{1}{V_m(-\cos\theta_{max})}\right] \quad (20)$$

Rather than using equation 20, an alternative and less precise method of calculating the derivative is to split the line-to-line sinewave voltage waveform into multiple sections over the 90 to 180 degree portion. The derivative approximating each section could be stored in a look-up table, and obtained from the table as a function of the input variable $\theta_{max}$. The disadvantage of this method is that it is less robust concerning input line transients.

Knowing $\Delta\theta$ from equation 19 and $\theta_{max}$ from equation 12, $\theta_{min}$ can then be easily determined by rearranging equation 15.

$$\theta_{min} = \theta_{max} - \Delta\theta \quad (21)$$

An alternative method of determining $\theta_{min}$ (or $t_1$) is to determine $\theta_{max}$ (or $t_2$) as in equation 12, and then keeping $\theta_{min}$ fixed with respect to $\theta_{max}$. Thus, $\theta_{min}$ would always equal the instantaneous operating point $\theta_{max}$ less the predetermined constant $\Delta 74$. This method suffers the disadvantage of being less robust to line transients.

In the preferred embodiment, however, equations 12, 19, 20, and 21 are used by microprocessor 174 to determine the value of $\theta_{min}$ and $\theta_{max}$. Having determined $\theta_{min}$ and $\theta_{max}$, all of the theoretical unknowns have been determined. All that remains to be described is how to implement in practice the algorithm described above for determining SCR firing angles.

4. Block Diagram of Practical Implementation

Figure 8:
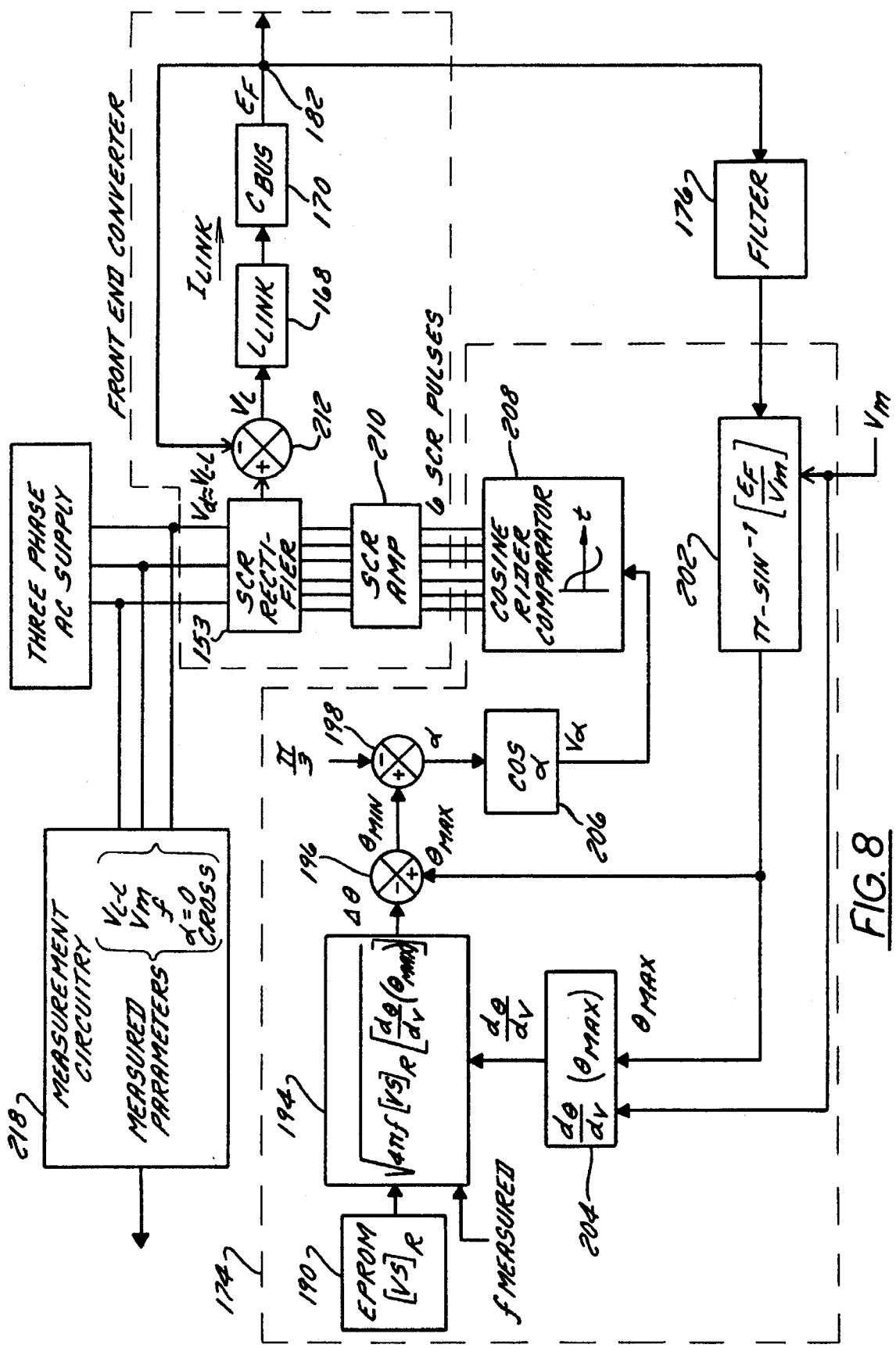
FIG. 8 is a block diagram of an AC to DC converter comprising a precharge circuit constructed in accordance with the preferred embodiments of the present invention.

Referring to FIG. 8, a practical implementation of the above mathematical derivation is shown. In particular, functions performed by the microprocessor 174 are more fully illustrated.

The microprocessor 174 has line-to-line voltage measurement inputs, peak line-to-line magnitude measurement inputs, and a frequency measurement input. These measurements are all made by conventional measurement circuitry 218 whereafter they are sent to the microprocessor 174. The microprocessor also has a bus capacitor voltage measurement $E_f$ input. The bus capacitor voltage measurement $E_f$ is measured at output 182, passed through filter 176, whereafter it enters the microprocessor 174.

The microprocessor 174 uses these inputs to implement equations 12, 19, 20, and 21 as described above. First, the $E_f$ and $V_m$ measurements are used at computation module 202 to calculate $\theta_{max}$ using equation 12 above. A look-up table may be used by microprocessor 174 to calculate the inverse SIN function in equation 12.

Second, at computation module 204, equation 20 is calculated using the output of computation module 202 $\theta_{max}$ and the input $V_m$ which was measured at measurement circuitry 218.

Third, the derivative calculated in computation module 204 is then used at computation module 194 to implement equation 19. In addition to the output of computation module 204, computation module 194 also uses the frequency measurement made at measurement circuitry 218 and the value of $VS_R$ which is stored in EPROM 190.

Finally, the output of computation module 194 $\Delta\theta$ and the output of computation module 202 $\theta_{max}$ are used at summing module 196 to implement equation 21. The output of the summing module 196 is $\theta_{min}$.

The precharge circuit can not use the value of $\theta_{min}$ directly to turn on the SCRs in the SCR rectifier 153. Rather, $\theta_{min}$ must first be converted into a firing angle $\alpha$, and $\alpha$ must then be further converted into an SCR control voltage $V(\alpha)$.

The actual SCR firing angle $\alpha$ can be calculated from $\theta_{min}$.

$$\alpha = \theta_{min} - \frac{\pi}{3} \quad (22)$$

Equation 22 is implemented at summing module 198 using the output of computation modules 194 and 196.

The SCR radian firing angle $\alpha$ is then converted to an SCR control voltage $V(\alpha)$ using equation 23.

$$V(\alpha) = \cos(\alpha) \quad (23)$$

This equation is implemented at computation module 206 using the output of computation module 198.

$V(\alpha)$ is then compared to a conventional ±1 volt cosine rider waveform to determine actual firing times by using a cosine rider comparator 208. The cosine rider waveform is of a type known to one skilled in the art. The output of the cosine rider comparator 208 is also the output of the microprocessor 174.

An alternative implementation of the computation module 206 and comparator 208 could be accomplished in hardware rather than in software. In this case, the output of the microprocessor would be the radian firing angle $\alpha$.

The firing information output of the microprocessor 174 is then sent to a signal amplifier 210, which actually fires the SCRs in rectifier 153. The SCRs in rectifier 153 accept the control signals from the microprocessor 174 (as amplified by amplifier 210) as well as accepting a supply of charge from the AC supply 152. The SCRs in rectifier 153 thus act as switching devices and provide an interface allowing the microprocessor 174 to selectively transfer charge from the AC supply 152 to the bus capacitor 170 via link inductor 168. The link inductor 168 and bus capacitor 170 operate to accept the charge from the AC supply 152 in the manner already described above.

Summing module 212 illustrates that the voltage $V_L$ across the link inductor 168 is the difference between the bridge output $V_d$ (or approximately the line-to-line voltage $V_{1-1}$) and the bus capacitor voltage $E_f$. Thus, the capacitor voltage $E_f$ is the only feedback element controlling the current through the link inductor and bus capacitor.

Operational Characteristics

Referring again now to FIGS. 7A and 7B, system performance for one 60 degree cycle is illustrated. During this cycle, it is the line-to-line voltage between phases A and B which is charging the capacitor (i.e., $V_{1-1} \leq V_{ab}$).

FIG. 7A illustrates $V_{1-1}$ as it varies with phase angle, as illustrated by curve 225. The area of shaded region 228 in FIG. 7A is equal to the $VS_R$ volt-second reference parameter. Also, it was assumed that there is only a small incremental increase in capacitor voltage during each charge cycle. Therefore, curve 236 illustrates the capacitor voltage $E_f$ as a constant. The difference between the $V_{1-1}$ and $E_f$ is equal to the voltage across the link inductor 168.

Figure 7B:
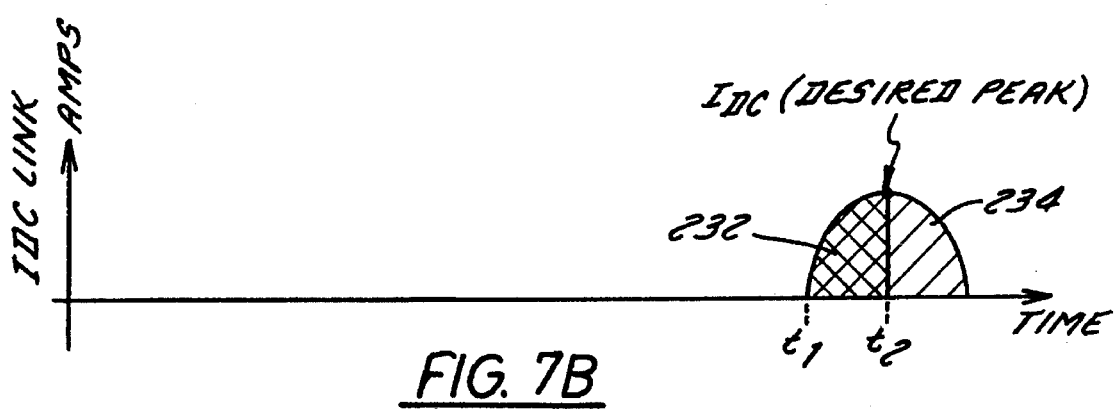

FIG. 7B illustrates the current through the inductor 168 as it varies with time. Corresponding to shaded region 228 is shaded region 232 in FIG. 7B. The area of shaded region 232 is equal to the amount of charge which flows into bus capacitor 170 during the active precharge interval.

Discussing now the operation of the system at operating point 222, the capacitor 170 starts to charge at point 226 on curve 225. Point 226 corresponds to a phase angle $\theta_{min}$ and a time $t_1$ where the SCR is turned on (see FIG. 7B). The bus capacitor voltage $E_f$ and line-to-line voltage $V_{1-1}$ are equal at point 223 on curve 225, corresponding to $\theta_{max}$ and $t_2$ (see FIG. 7B). During this active precharge interval, the charge illustrated in shaded region 232 will be transferred from the AC supply 152 to the bus capacitor 170.

Shaded regions 230 and 234 are a result of current build-up in the link inductor 168. Thus, when the difference of $V_{1-1}$ and $E_f$ is negative, the resulting volt-seconds across the inductor will cause inductor current to decrease until the current is zero. At zero current, the SCRs are no longer forward biased and will turn off under conventional line commutation processes. During this passive precharge interval, the charge illustrated in shaded region 234 will be transferred from the link inductor 168 to the bus capacitor 170.

The positive and negative volt-seconds across the inductor must be equal so that the area of shaded region 230 will equal that of shaded region 228 at the end of the precharge interval. Similarly, the areas of regions 234 and 232 will also be equal. The amount of time that it takes for inductor current to decrease is not critical.

FIG. 7A also illustrates the progression of the system from initial operating point 220 to final operating point 224 for a previously uncharged capacitor. Thus, the x-axis is also shown to be α, which does not vary with time but which corresponds to $\theta_{min}$ by a 60 degree constant. Both α and $\theta_{min}$ vary as the operating point moves from 220 to 224.

When the precharge circuit 157 is first initialized, the system is at an operating point (not shown) such that α>120°. In the preferred embodiment, α is initially set to 150°. When the precharge circuit first starts to charge the capacitor, the system will be at operating point 220 on FIG. 7A. At operating point 220, the capacitor voltage is zero. As charge is added to the capacitor 170, the system moves through operating point 222. When the capacitor 170 is fully charged, the system will be at operating point 224.

Figure 9:
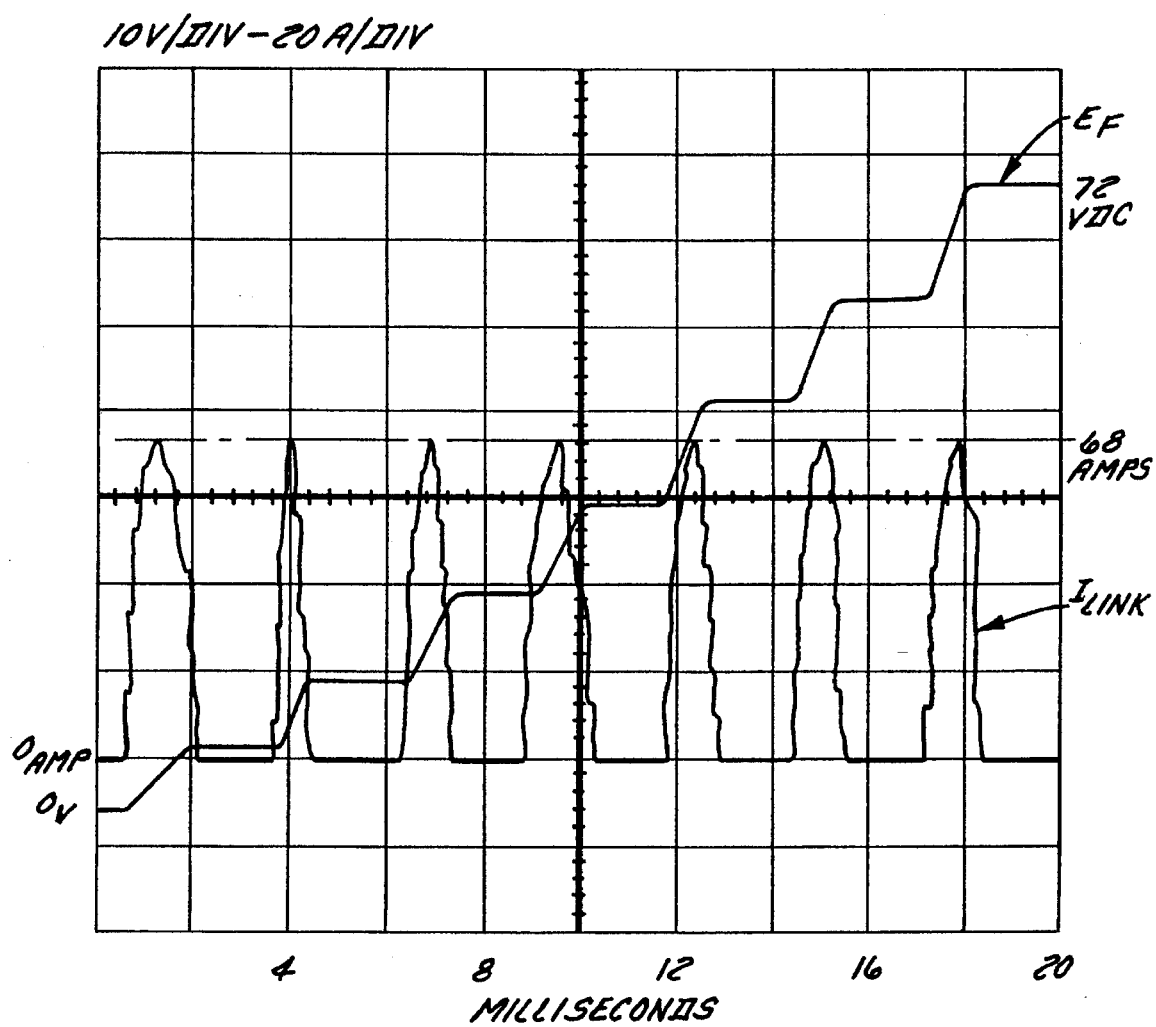
FIGS. 9 and 10 illustrate link current and bus capacitor voltage as a capacitor is being precharged using the present invention.

Referring to FIG. 9, the link current and bus capacitor voltage verses time for the partial precharge of a capacitor 170 is shown. The capacitor 170 is charged from zero volts DC to approximately 72 VDC.

The discontinuous current waveform is a train of approximately equal current pulses. For each current pulse there is a corresponding change in the capacitor voltage. The capacitor voltage changes are roughly equal in magnitude as well. This is due to the fact that the same amount of charge is added to the capacitor 170 during each charge interval.

Figure 10:
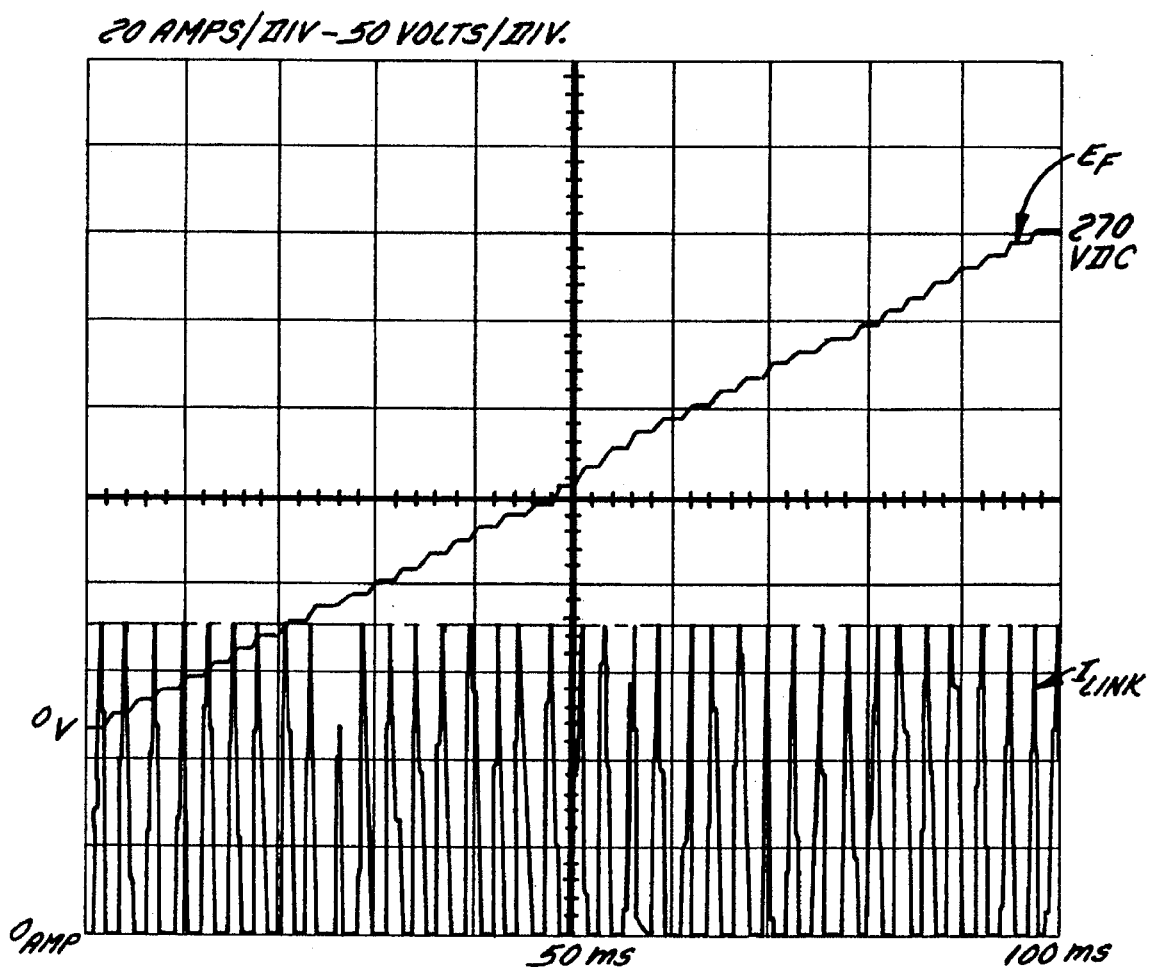

Referring now to FIG. 10, a reduced time scale graph similar to that shown in FIG. 9 is shown. The capacitor 170 in this case charges from zero volts to approximately 320 VDC. Each step in capacitor voltage corresponds to a current pulse. Again, the DC link current pulses are approximately equal in magnitude, as are the changes in capacitor voltage.

Figure 11:
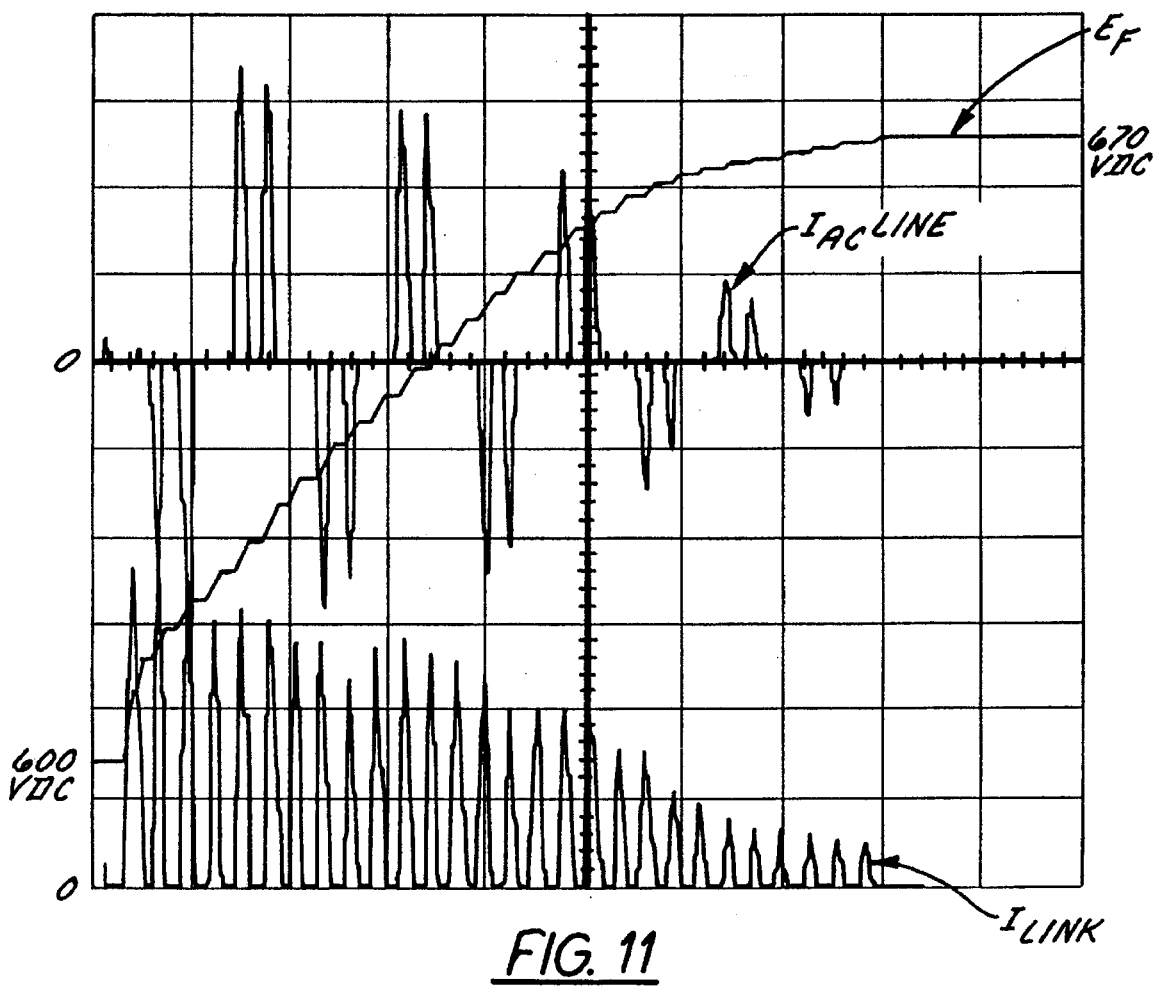
FIG. 11 illustrates link current, AC line current, and capacitor voltage as a capacitor is being charged using the present invention from an initially precharged condition.

Referring now to FIG. 11, operation into a partially charged bus capacitor 170 is shown. The bus capacitor 170 is initially at 600 VDC and is further charged to 670 VDC. Particularly relevant in this figure is the fact that there is no overshoot in the bus voltage with this control scheme. Rather, the AC line current, DC link current, and DC bus voltage taper smoothly into their final steady state precharge values.

Unlike conventional precharge circuits, the precharge circuit 157 of the present invention is non-linear and is not governed by linear phase control theory. Thus, once the capacitor 170 is charged, the microprocessor 174 can immediately terminate the precharge mode and the system can enter into normal steady state operation. The voltage overshoots which are characteristic of linear systems are not present in the microprocessor controlled system of the present invention.

Referring now to FIGS. 12 and 13, the performance of the precharge circuit 157 of the present invention is compared with the performance of prior art precharge circuits. Performance is illustrated in undervoltage situations. Note that the time references $T_1$ and $T_2$ used in FIGS. 12 and 13 are not related to the SCR firing time parameters $t_1$ and $t_2$ defined earlier. Also, the parameter $V_{bus}$ is now defined as the voltage across the bus capacitor when the bus capacitor is fully charged.

In FIG. 12, performance during an undervoltage of relatively small time duration is illustrated. Performance of the present invention is illustrated in FIGS. 12A and 12B. At time $T_1$, there is an AC line loss and the AC supply 152 is no longer present. The bus capacitor 170 will stay on-line with the output and charge stored in the capacitor 170 will continue to supply the load on the DC output with power after the AC line loss. However, the charge will not be replenished and therefore the bus capacitor voltage will decrease as illustrated by $E_f$ in FIG. 12A. The rate at which the capacitor 170 discharges will depend on the size of the bus capacitor 170 and the load that it is supplying. Since the AC supply is no longer present, the line current drops to zero during $T_1$ and $T_2$ as shown in FIG. 12B.

Figure 1:
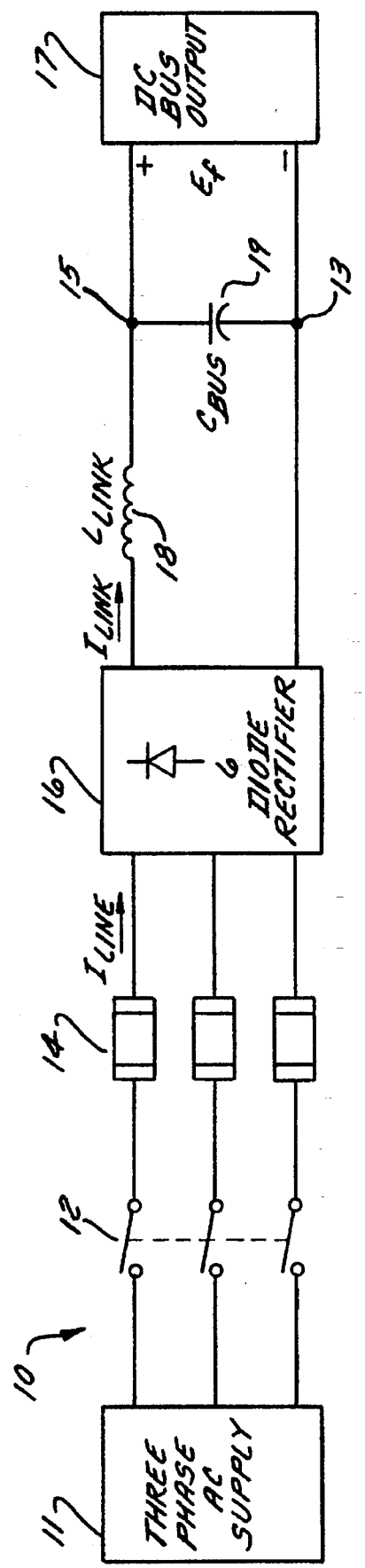
FIG. 1 is a schematic of an AC to DC converter without a precharge circuit, appropriately labelled "PRIOR ART"
Figure 2:
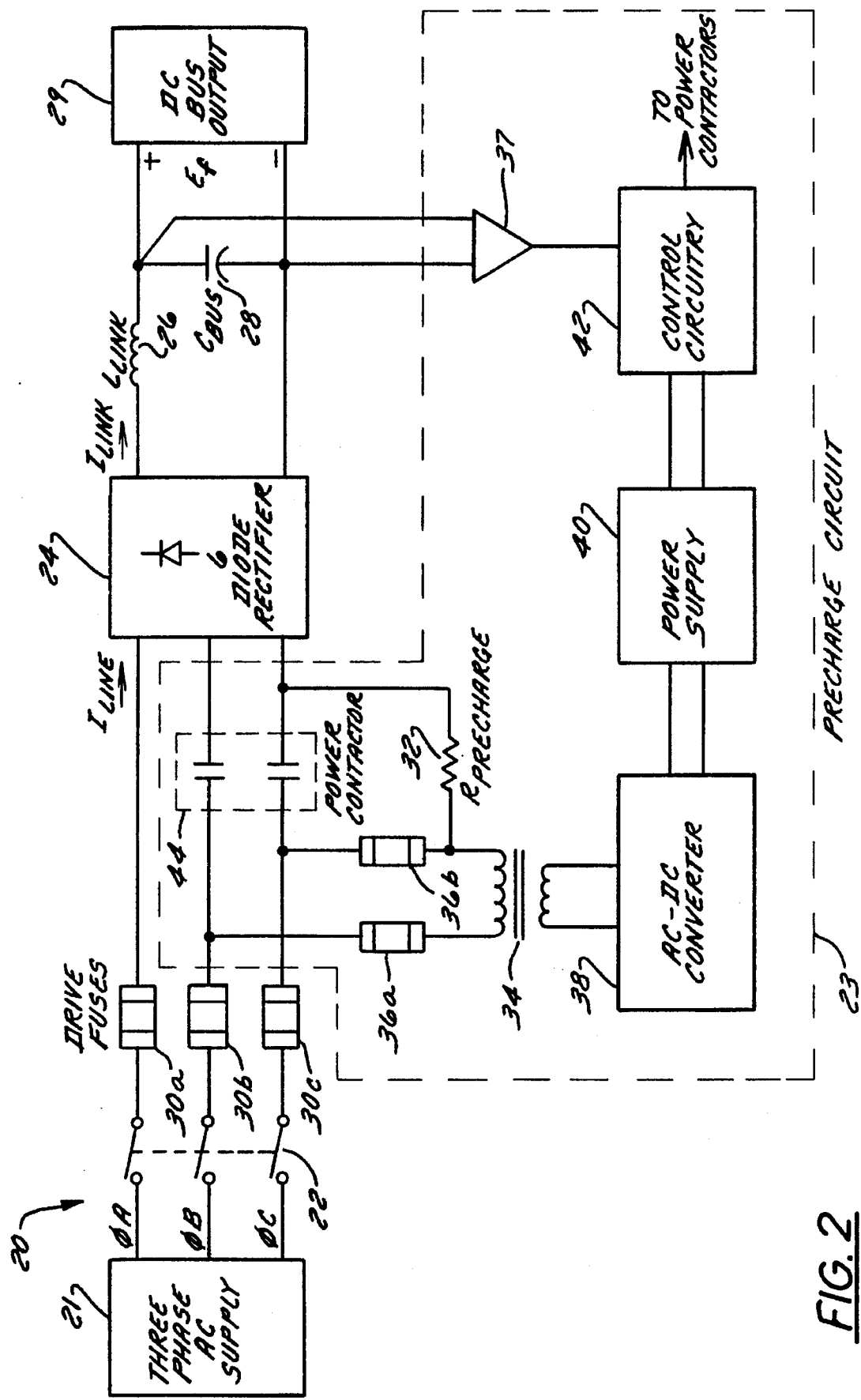
FIG. 2 is a schematic of an AC to DC converter with a precharge circuit, appropriately labelled "PRIOR ART"
Figure 3:
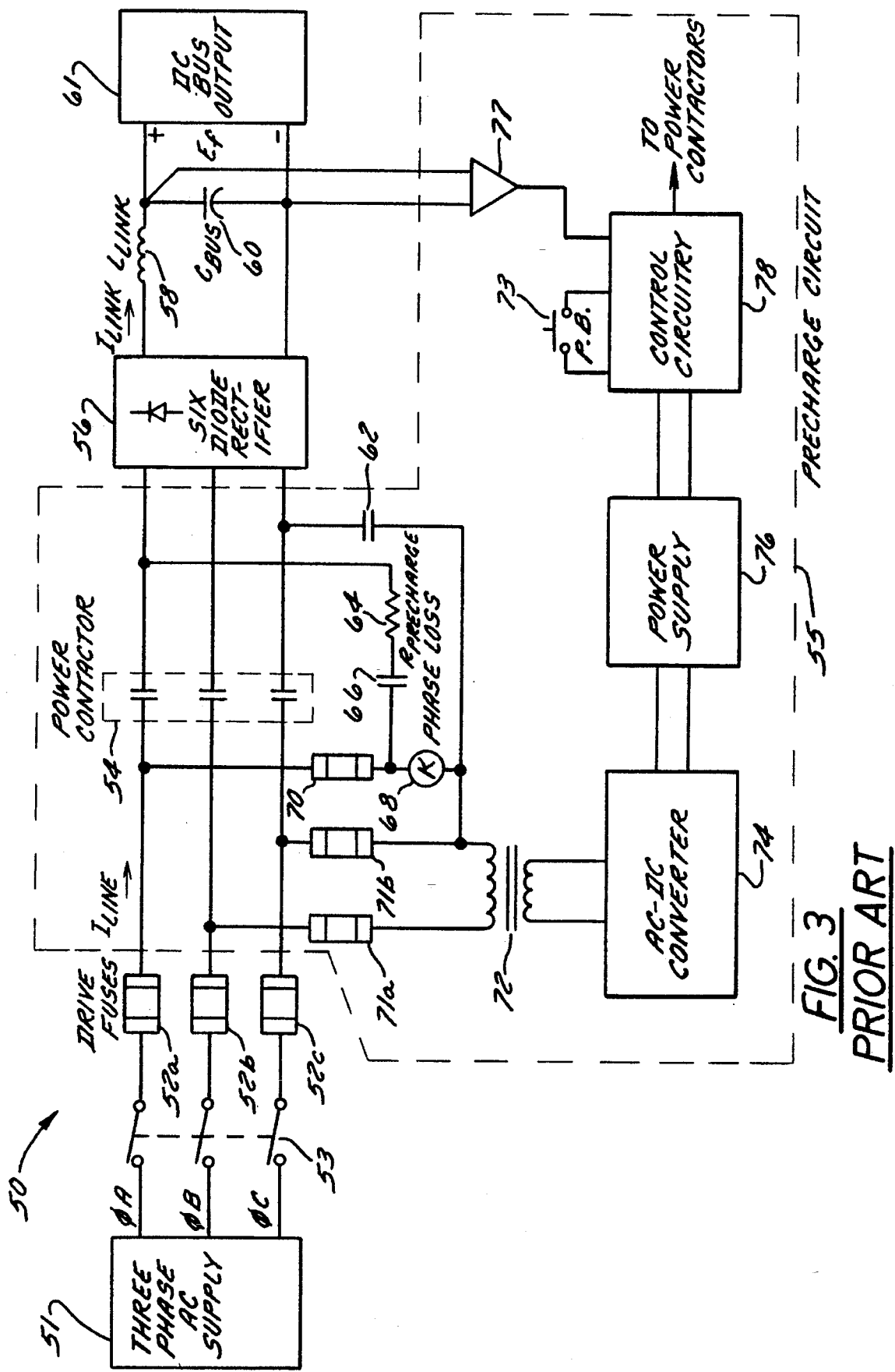
FIG. 3 and FIG. 4 are schematics of commonly used AC to DC converters with precharge circuits, appropriately labelled "PRIOR ART"
Figure 4:
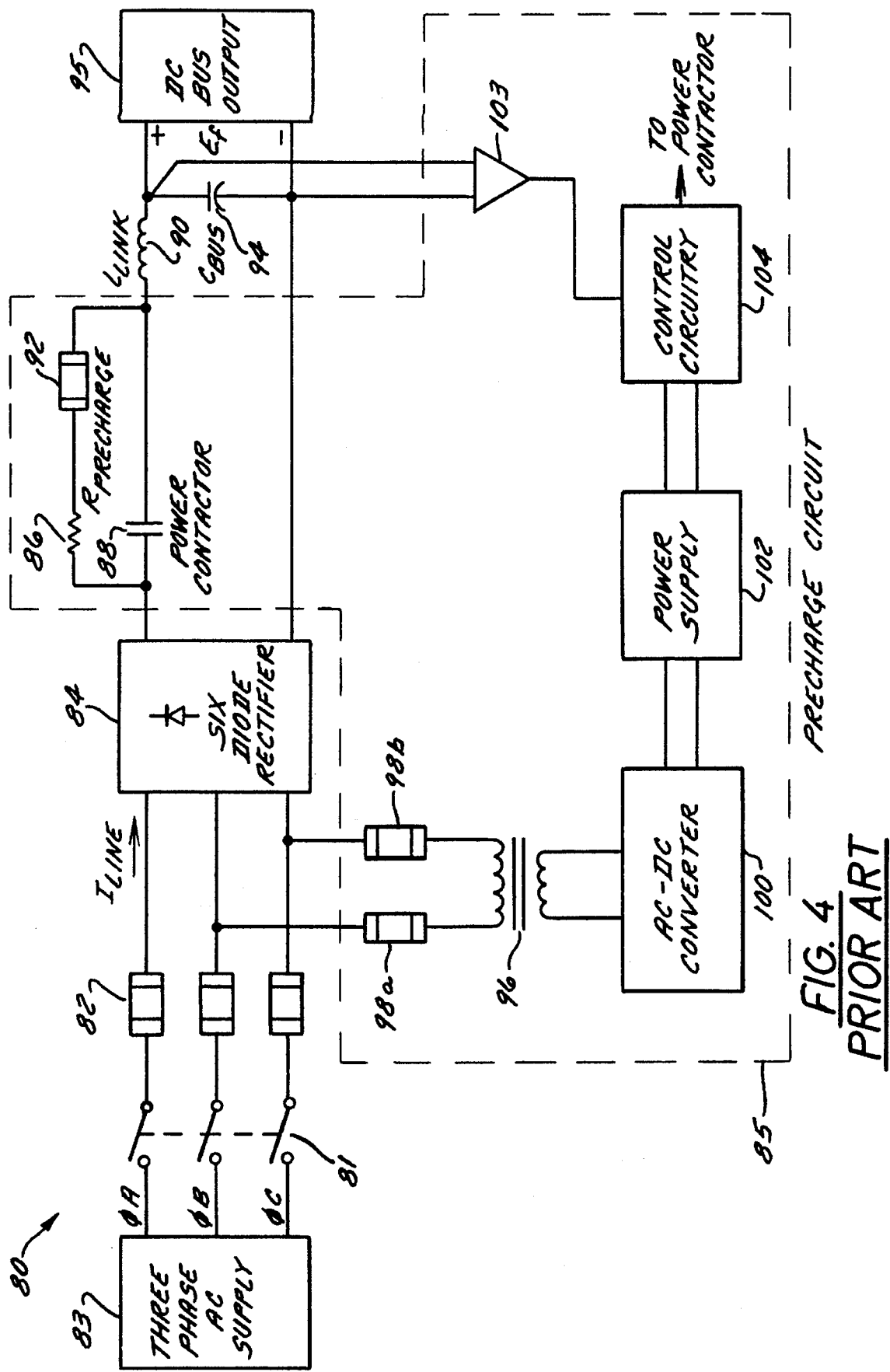
Figure 5:
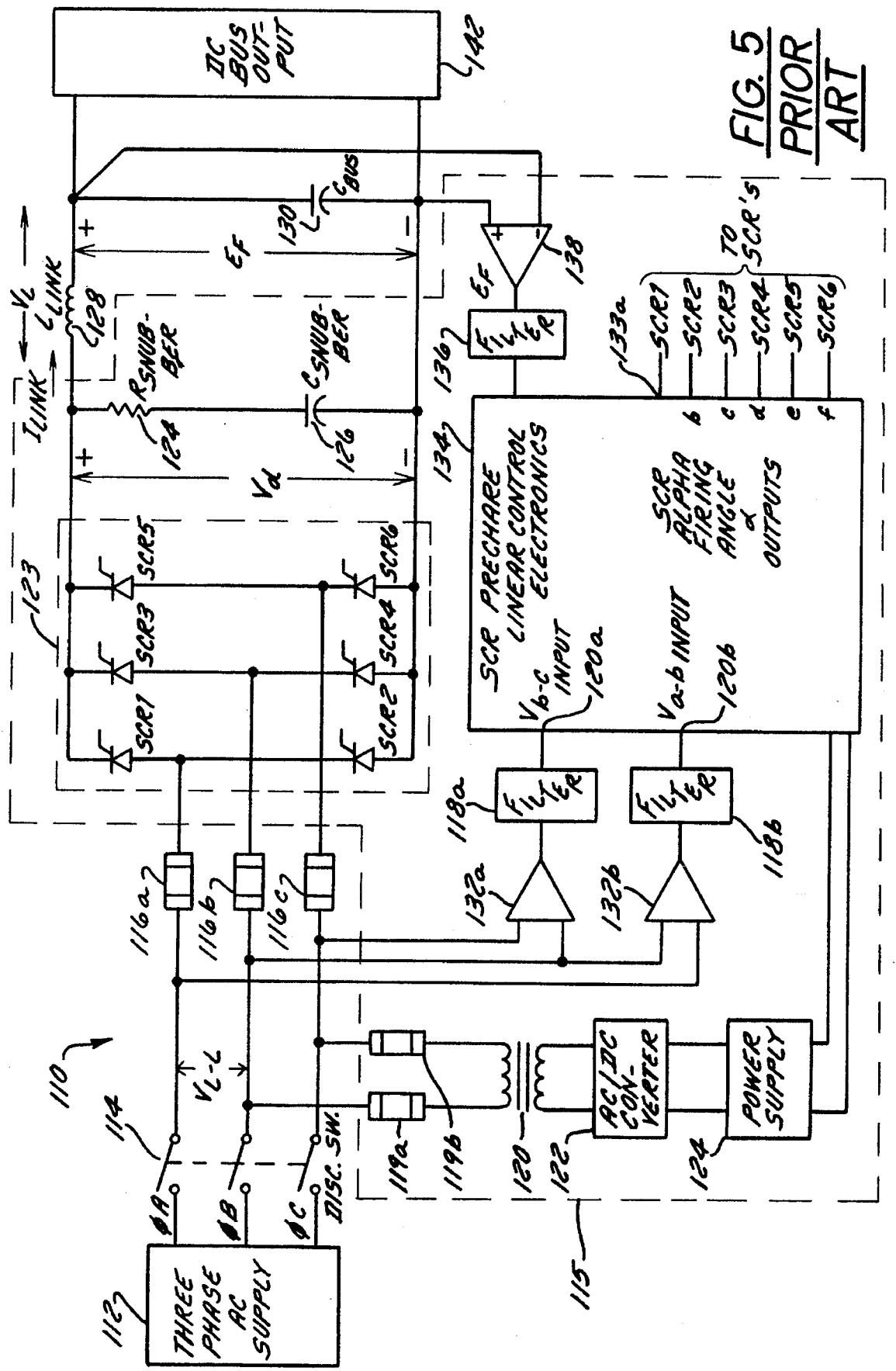
FIG. 5 is a schematic of an AC to DC converter comprising SCRs and utilizing a conventional linear phase control scheme to control precharge current, appropriately labelled "PRIOR ART"

The loss of the AC supply 152 will not result in lost power for the microprocessor 174. In conventional precharge circuits such as precharge circuit 55 of FIG. 3, the precharge circuit receives power directly from the AC supply 51. In the preferred embodiment of the precharge circuit of the present invention, the precharge circuit 157 receives power from either the bus capacitor 170 or the AC supply 152. Therefore, the microprocessor 174 will remain powered at least as long as the capacitor 170 has stored charge. The microprocessor 174 may remain powered even longer depending on the output capacitance of power supply 177.

At time T2, the AC supply 152 comes back on-line. At first, the AC will not supply the load directly; rather, the precharge circuit 157 in the converter will activate so as to recharge the bus capacitor 170. The bus capacitor 170 must again be "precharged," otherwise severe transients will occur which are similar to those occurring in prior art converter 10.

When the AC supply 152 comes back on-line, the line current will return almost immediately to full rated converter value and charge the DC bus capacitor 170 in the fastest possible time. An important feature of the present invention is this ability to precharge using full rated steady state current on all three phases. The current will continue to flow at this rate at least until the capacitor 170 is fully charged at time $T_3$. Depending on the load which is on the DC output of the converter, current may or may not continue to flow at the rated maximum.

Figure 12A:
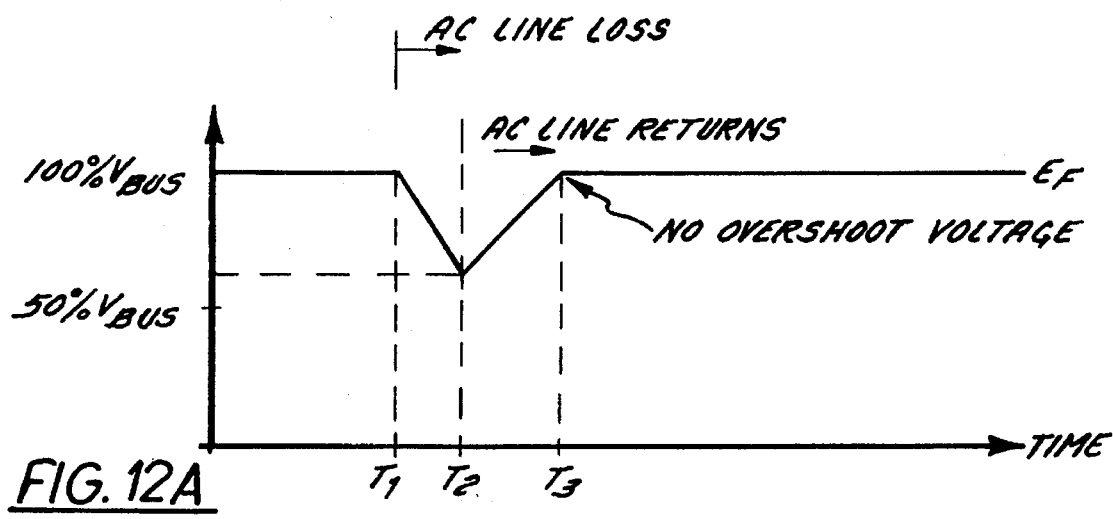
FIGS. 12A–12D and 13A–13D compare performance of prior art precharge circuits and the precharge circuit of the present invention in the event of an undervoltage.
Figure 12B:
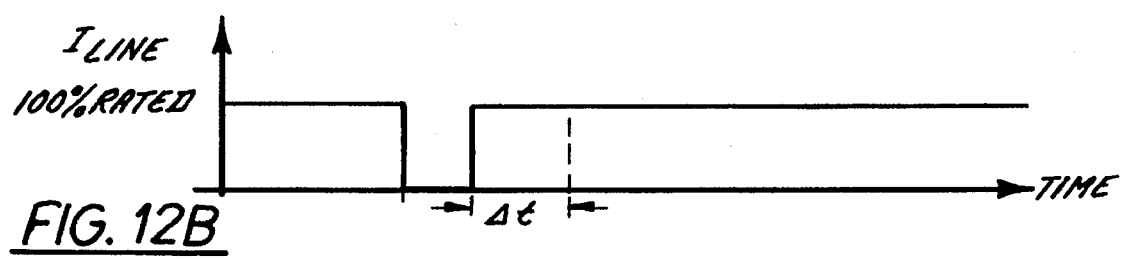
Figure 12C:
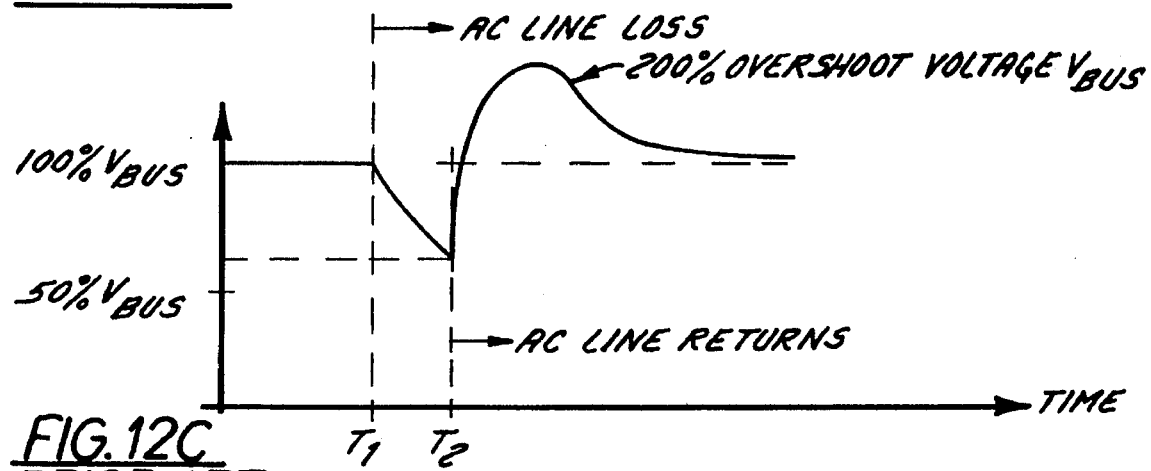
Figure 12D:
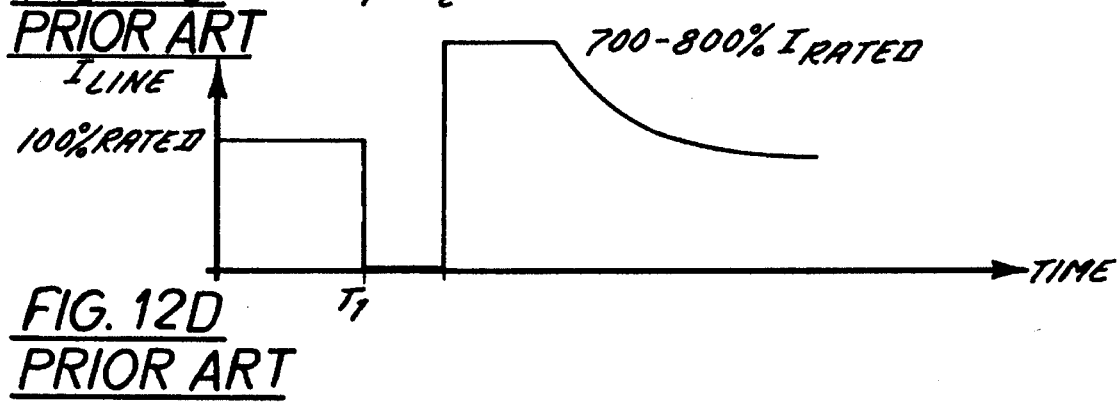

Performance of prior art (such as precharge circuit 55) in the same undervoltage situation is illustrated in FIGS. 12C and 12D. Again there is a line loss at time $T_1$ and the capacitor begins to discharge. At time $T_2$, the AC supply 51 comes back on-line. However, the precharge circuit 55 is inactive and power contactor 54 remains closed until a 50% rated $V_{bus}$ trip point is reached. Thus, capacitor recharge current is limited only by the surge impedance of the link inductor and the bus capacitor. This will result in possible link inductor saturation, AC line currents of 700–800% rated, and large underdamped bus voltage overshoots (as experienced with converter 10). Thus, prior art circuits are not able to optimally recharge the capacitor using rated converter current from all three phases. Additionally, the high charging current in each phase may cause fuses 52a, 52b, and 52c to open, thereby causing the AC to DC converter 50 to eventually go off line.

This is a great disadvantage of prior art schemes. In an industrial setting, costly down time will result when the converter goes off-line. Electricians, for example, will have to track down why a system shut down and correct it. Meanwhile, valuable production time is wasted.

In FIG. 13, performance during an undervoltage of a relatively longer duration is illustrated. Performance of the present invention is illustrated in FIGS. 13A and 13B. At time $T_1$, there is an AC line loss and the AC supply 152 is no longer present. Again, the voltage across the capacitor 170 will continue to decrease until a time $T_3$ when the AC supply 152 comes back on-line. The precharge circuit 157 will then optimally recharge the capacitor 170 within converter current ratings until a time $T_4$ when the capacitor 170 is fully recharged.

Figure 13A:
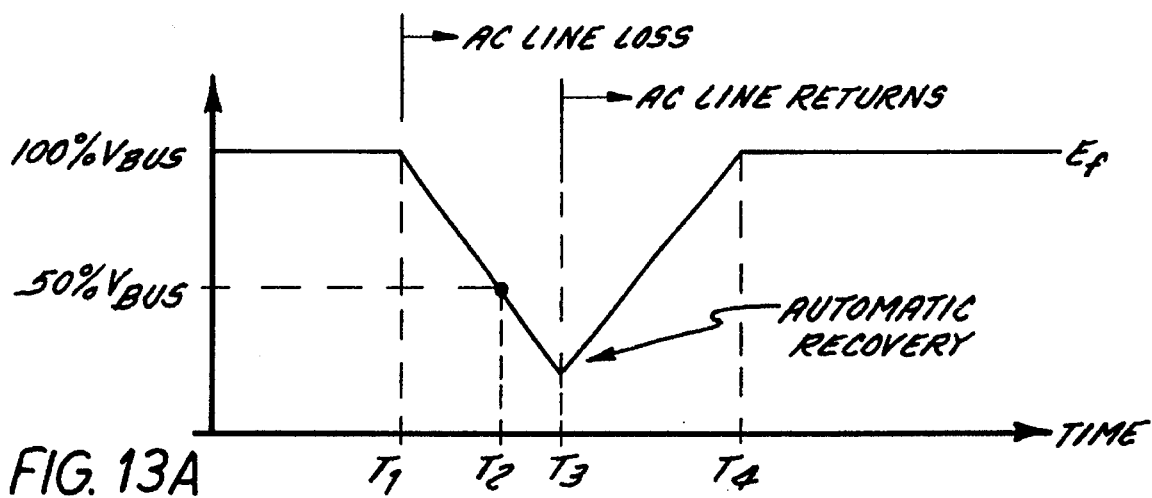
Figure 13B:
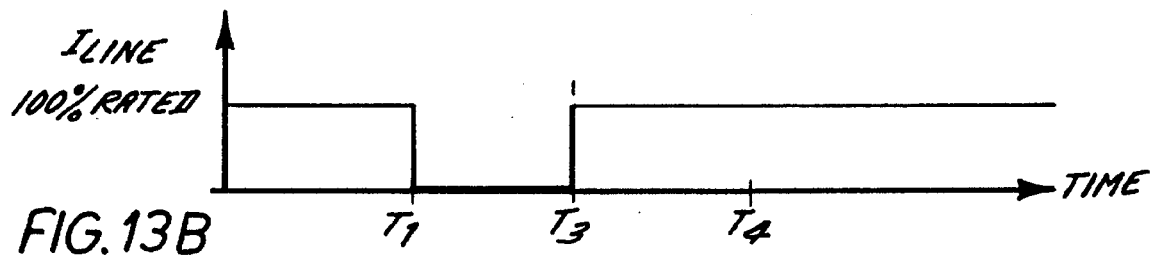
Figure 13C:
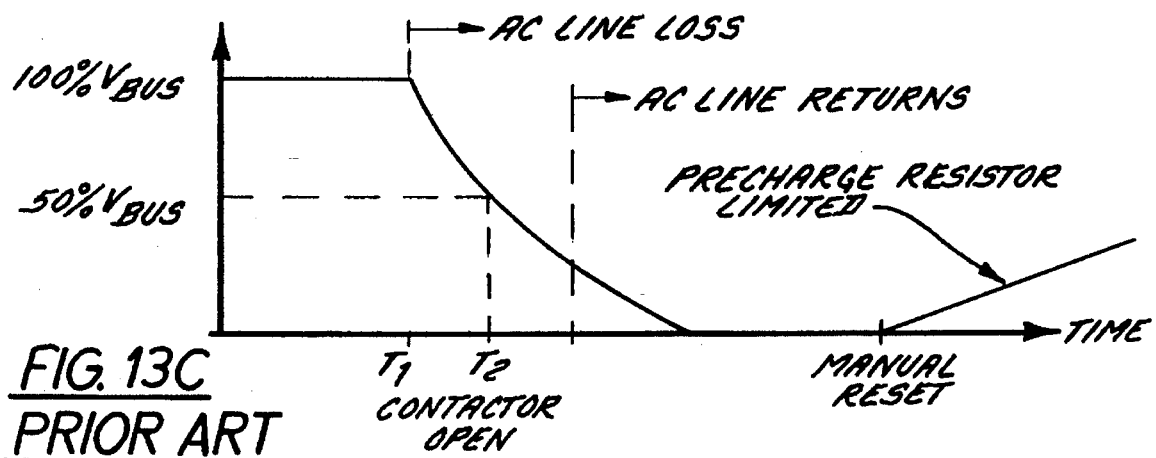
Figure 13D:
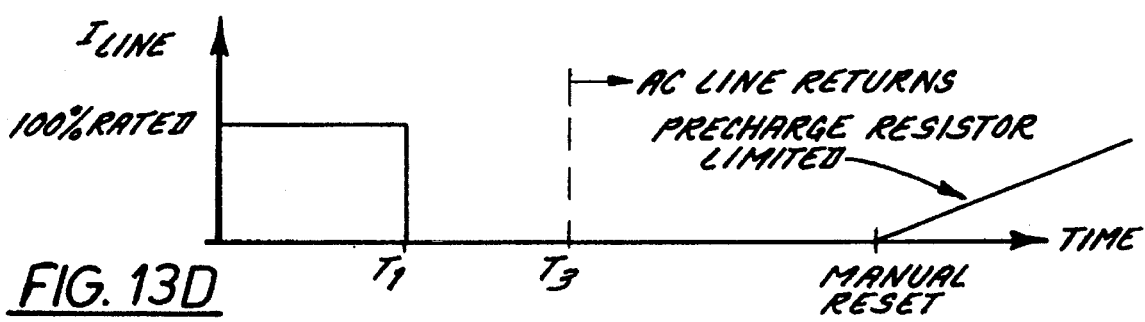

Performance of prior art (such as precharge circuit 55) in the same situation is illustrated in FIGS. 13C and 13D. In this case, however, many prior art schemes automatically trip at a time T2 when the bus voltages decreases to a value that is only 50% the fully charged value. Therefore, the power contactor 54 in the prior art scheme will open and there will be no chance of recovery from the momentary undervoltage when power returns at time $T_3$. Prior art schemes require a manual restart followed by a long time interval due to precharge resistor 64 which limits precharge current.

Another feature of the invention, not illustrated in any figure, is its robust control in the event of a ground or bus fault. In the event of a fault condition prior to equipment energization, prior art precharge circuits will cause large amounts of current to flow into the fault. The precharge circuit 157 of the present invention, however, will limit the current that flows into the fault in the same manner that it limits current during precharge mode. Moreover, the microprocessor 174 can be programmed to sense that the capacitor 170 is not charging and respond by terminating the transfer of charge.

Many changes and modifications could be made to the present invention without departing from the spirit and scope thereof. For instance, the invention could be adapted to work with a single phase system. In this embodiment, the elements corresponding to one branch of the circuit would be removed (e.g., SCRs 162a and 162b, one of the fuses 156, one of the differential amplifiers 159 and one of the filters 161 could be removed to eliminate the phase C branch). The single phase AC supply would then be input to the remaining two branches. The control algorithm as described above can be applied directly to a single phase system, except that only one line-to-line voltage would be used to precharge the capacitor rather than three line-to-line voltages.

In another embodiment, the present invention could be used in conjunction with a semi-converter bridge. In this case, SCRs 158b, 160b, and 162b would be replaced with diodes. The control algorithm would be changed so as to transfer charge only every other 60° cycle. Additionally, this embodiment could be combined with the single phase embodiment just discussed so as to create a single-phase semi-converter system.

It is to be understood that embodiments of the present invention not disclosed herein are fully intended to be within the scope of the appended claims.

We claim:

1. A circuit comprising:
   A. a capacitor;
   B. a source of charge;
   C. an inductor coupled to said capacitor;
   D. voltage measuring means for taking a voltage measurement of said capacitor;
   E. voltage measuring means for taking a voltage measurement of said source of charge; and
   F. a capacitor precharge subcircuit for precharging said capacitor, said precharge subcircuit including
   (1) a switching device for transferring a charge from said source of charge to said inductor and to said capacitor, and
   (2) a microprocessor, said microprocessor defining
      (a) means for determining a first point in time at which a charge transfer from said source of charge to said inductor and to said capacitor is to be initiated, said first point in time being based on said capacitor voltage measurement, said source of charge voltage measurement and a reference parameter based on a desired peak current,
      (b) means for determining a second point in time at which said charge transfer from said source of charge to said inductor and to said capacitor is to be terminated, said second point in time being based on said capacitor voltage measurement and said source of charge voltage measurement, and
      (c) means for controlling said switching device at said first and second points in time.

2. The circuit as defined in claim 1, wherein said source of charge is an AC supply.

3. The circuit as defined in claim 1, wherein said AC supply is a three phase AC supply.

4. The circuit as defined in claim 3, wherein said switching device is one of Silicon Controlled Thyristor, Gate Turn-off Thryistor, and Insulated Gate Bipolar Transistor.

5. A method of precharging a capacitor from an AC supply, said method comprising the steps of:
   A. taking voltage measurements of said AC supply;
   B. taking voltage measurements across said capacitor;
   C. providing said AC supply voltage measurements and said capacitor voltage measurements to a microprocessor;
   D. using said microprocessor to selectively transfer charge from said AC supply to said capacitor and to an inductor, said transferring step including the steps of:
      (1) defining a desired peak current,
      (2) determining a reference parameter based on said desired peak current,
      (3) determining a first point in time at which the charge transfer from said AC supply to said capacitor and to said inductor is to be initiated, said first point in time being determined based on said reference parameter, said AC supply voltage measurements, and said capacitor voltage measurements;
      (4) determining a second point in time at which said charge transfer is to be terminated, said second point in time being determined based on said AC supply voltage measurements and said capacitor voltage measurements, and
      (5) initiating said charge transfer based on said first point in time, and terminating said charge transfer based on said second point in time.

6. The method as defined in claim 5, wherein said first point in time and said second point in time are determined by approximating said AC supply as a ramp function during said charge transfer.

7. The method as defined in claim 5, wherein said first point in time and said second point in time are retrieved from a microprocessor storage means.

8. A method of precharging a capacitor from an AC supply, said method comprising the steps of:
   A. taking voltage measurements of said AC supply;
   B. taking voltage measurements across said capacitor;
   C. providing said AC supply voltage measurements and said capacitor voltage measurements to a microprocessor;
   D. using said microprocessor to selectively transfer charge from said AC supply to said capacitor and to an inductor, said transferring step further including the steps of:
      (1) determining a first point in time at which the charge transfer from said AC supply to said capacitor and to said inductor is to be initiated, said first point in time being fixed with respect to a second point in time at which said charge transfer is to be terminated, (2) determining said second point in time, said second point in time being determined based on said AC supply voltage measurements and said capacitor voltage measurements, and (3) initiating said charge transfer based on said first point in time, and terminating said charge transfer based on said second point in time.

9. A circuit comprised of:

A. a three phase AC supply;

B. a capacitor, said capacitor forming an output of said circuit;

C. an inductor coupled to said capacitor; and

D. a capacitor precharge subcircuit for precharging said capacitor, said precharge subcircuit including (1) a bridge rectifier further comprised of Silicon Controlled Thyristors, (2) voltage measuring means for taking voltage measurements of said three phase AC supply (3) voltage measuring means for taking voltage measurements of said capacitor, and (4) a microprocessor, said microprocessor defining (a) means for determining a first point in time at which a charge transfer from said AC supply to said inductor and to said capacitor is to be initiated, said first point in time being based on said capacitor voltage measurement, said AC supply voltage measurement and a reference parameter based on a desired peak current, (b) means for determining a second point in time at which said charge transfer from said AC supply to said inductor and to said capacitor is to be terminated, said second point in time being based on said capacitor voltage measurement and said AC supply voltage measurement, and (c) means for controlling said Silicon Controlled Thyristors at said first and second points in time.

10. The circuit as defined in claim 9, wherein said three phase AC supply is received from one of a utility company and an independent generator.

11. The circuit as defined in claim 9, further comprised of a resistor in series with a capacitor, which together are in parallel with said bridge rectifier.

12. The circuit as defined in claim 9, wherein said AC supply voltage measurements and said capacitor voltage measurements are filtered before being provided to said microprocessor.

13. The circuit as defined in claim 1, wherein said reference parameter corresponds to the amount of charge which is transferred to said capacitor between said first point in time and said second point in time.

14. The circuit as defined in claim 1, wherein said first point in time remains fixed with respect to said second point in time.

15. The circuit as defined in claim 9, wherein said reference parameter corresponds to the amount of charge which is transferred to said capacitor between said first point in time and said second point in time.

16. The circuit as defined in claim 9, wherein said first point in time remains fixed with respect to said second point in time.

* * * * *